US012707465B2

(12) United States Patent
Fouad et al.

(10) Patent No.: US 12,707,465 B2
(45) Date of Patent: Aug. 11, 2026

(54) EFFICIENT TECHNIQUES FOR RESOURCE SELECTION ASSISTANCE REPORTING FOR NR REL-17 SIDELINK

(71) Applicant: Samsung Electronics Co., Ltd., Gyeonggi-do (KR)

(72) Inventors: Yaser Mohamed Mostafa Kamal Fouad, San Diego, CA (US); Jung Hyun Bae, San Diego, CA (US); Sili Lu, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/589,761

(22) Filed: Feb. 28, 2024

(65) Prior Publication Data

US 2024/0205922 A1 Jun. 20, 2024

Related U.S. Application Data

(63) Continuation of application No. 17/469,375, filed on Sep. 8, 2021, now Pat. No. 11,950,233.

(60) Provisional application No. 63/161,648, filed on Mar. 16, 2021, provisional application No. 63/104,830, filed on Oct. 23, 2020, provisional application No. 63/089,709, filed on Oct. 9, 2020.

(51) Int. Cl.

*H04W 72/20* (2023.01)
*H04W 72/51* (2023.01)
*H04W 4/40* (2018.01)

(52) U.S. Cl.

CPC .......... *H04W 72/20* (2023.01); *H04W 72/51* (2023.01); *H04W 4/40* (2018.02)

(58) Field of Classification Search

None

See application file for complete search history.

(56) References Cited

U.S. PATENT DOCUMENTS

| | | | |
|---|---|---|---|
| 2019/0044667 | A1 | 2/2019 | Guo et al. |
| 2019/0222995 | A1 | 7/2019 | Abouelseoud |
| 2020/0029340 | A1 | 1/2020 | He et al. |
| 2020/0205166 | A1 | 6/2020 | Huang et al. |

(Continued)

FOREIGN PATENT DOCUMENTS

| | | |
|---|---|---|
| EP | 3 672 133 | 6/2020 |
| TW | 202037194 | 10/2020 |

(Continued)

OTHER PUBLICATIONS

LG Electronics, "New WID on NR sidelink enhancement", 3GPP TSG RAN Meeting #86 RP-193231, Sitges, Spain, Dec. 9-12, 2019 (revision of RP-193134), 6 pages.

(Continued)

*Primary Examiner* — Kodzovi Acolatse

(74) *Attorney, Agent, or Firm* — The Farrell Law Firm, P.C.

(57) ABSTRACT

A user equipment (UE) is provided that includes a memory and a processor. The processor is configured to determine whether to send assistance information. In response to determining to send the assistance information, the processor is also configured to transmit the assistance information either via sidelink control information (SCI) or via a medium access control (MAC) control element (CE) having one or more resource selection assistance information elements.

18 Claims, 9 Drawing Sheets

(56) References Cited

U.S. PATENT DOCUMENTS

2020/0288286 A1 9/2020 Hwang et al.
2020/0304159 A1 9/2020 Liao
2020/0314940 A1 10/2020 Park et al.
2020/0322095 A1 10/2020 Park et al.
2020/0344574 A1 10/2020 Park et al.
2021/0029585 A1 1/2021 Bharadwaj
2021/0058905 A1 2/2021 Ganesan
2021/0314965 A1* 10/2021 Hui ........................ H04W 72/20
2021/0400639 A1 12/2021 Lee et al.
2022/0030647 A1 1/2022 Lee
2022/0070826 A1* 3/2022 Xu ........................ H04W 72/02
2022/0116934 A1 4/2022 Zhang
2022/0116996 A1 4/2022 Lee
2022/0146619 A1* 5/2022 Bernsen ................ G01S 5/0205
2022/0217767 A1 7/2022 Lee
2022/0346065 A1 10/2022 Hui
2022/0408415 A1* 12/2022 Ji ...................... H04W 72/0446
2023/0123147 A1* 4/2023 Hwang ................... H04W 4/40 370/329
2023/0171796 A1 6/2023 Ji
2023/0180216 A1 6/2023 Hwang
2023/0209388 A1 6/2023 Hwang
2023/0209412 A1 6/2023 Liu

FOREIGN PATENT DOCUMENTS

WO WO 2020/063611 4/2020
WO WO 2020/091494 5/2020
WO WO 2020/145723 7/2020
WO WO 2021/119474 6/2021
WO WO 2021/207473 10/2021
WO WO-2021197581 A1 * 10/2021 ............. H04W 4/40
WO WO-2021207473 A1 * 10/2021 ............ H04W 72/02
WO WO 2022/000177 1/2022
WO WO-2022019540 A1 * 1/2022 ............. H04W 4/40
WO WO 2022/027441 2/2022
WO WO 2022/027500 2/2022
WO WO 2022/071762 4/2022

OTHER PUBLICATIONS

3GPP TS 38.214 V16.0.0 (Dec. 2019), 3rd Generation Partnership Project; Technical Specification Group Radio Access Network; NR; Physical layer procedures for data (Release 16), 148 pages.
3GPP TS 36.213 V15.7.0 (Sep. 2019), 3rd Generation Partnership Project; Technical Specification Group Radio Access Network; Evolved Universal Terrestrial Radio Access (E-UTRA); Physical layer procedures (Release 15), 551 pages.
Fraunhofer HHI, Fraunhofer IIS, "Resource Allocation for Mode 2 NR V2X", R1-1912289, 3GPP TSG RAN WG1 #99, Nov. 18-22, 2019, 9 pages.
LG Electronics, "Discussion on NR Sidelink resource allocation for Mode 1", R1-1910778, 3GPP TSG RAN WG1 #98bis Meeting, Oct. 14-20, 2019, 11 pages.
European Search Report dated Mar. 22, 2022 issued in counterpart application No. 21197424.1-1215, 11 pages.
Taiwanese Search Report dated Feb. 25, 2025 issued in counterpart application No. 110137420, 9 pages.
LG Electronics, "Discussion on Feasibility and Benefits for Mode 2 Enhancement", R1-2005749, 3GPP TSG RAN WG1 Meeting #102-e, Aug. 17-28, 2020, 8 pages.
Chinese Office Action dated May 20, 2026 issued in counterpart application No. 202111174582.1, 5 pages.

* cited by examiner

EFFICIENT TECHNIQUES FOR RESOURCE SELECTION ASSISTANCE REPORTING FOR NR REL-17 SIDELINK

PRIORITY

This application is a Continuation application of U.S. application Ser. No. 17/469,375, filed in the U.S. Patent and Trademark Office on Sep. 8, 2021, which is based on and claims priority under 35 U.S.C. § 119(e) to U.S. Provisional Patent Application Ser. Nos. 63/089,709, filed on Oct. 9, 2020; 63/104,830, filed on Oct. 23, 2020; and 63/161,648, filed on Mar. 16, 2021, the entire contents each of which are incorporated herein by reference.

FIELD

The present disclosure is generally related to resource selection in new radio (NR) vehicle to everything (V2X) environments.

BACKGROUND

In NR V2X, a Mode 2 resource selection procedure involves using a higher layer to request a user equipment (UE) to determine a subset of resources from which the higher layer will select resources for physical sidelink shared channel (PSSCH)/physical sidelink control channel (PSCCH) transmission.

In addition, in NR V2X, a Mode 2 resource selection procedure allows UEs to select their resources in a distributed manner. In this mode, UEs establish a sensing window and a resource selection window, whereby the resources are selected from the latter based on the sensing information obtained in the sensing window. Despite the advantages of this scheme, the scheme is limited by the UE's sensing capability and thus vulnerable to different types of communication problems, such as a hidden node problem, an exposed node problem, a half-duplex constraint, and/or consistent collisions.

To address these drawbacks, one possible approach is to consider resource selection assistance, whereby either the reception (Rx) UE or a neighboring UE can provide feedback on which resources should/shouldn't be selected. However, the realization of assistance gains is contingent upon the development of effective means by which the assistance information can be conveyed. In other words, the UEs must be able to exchange the assistance request/feedback in a timely manner with minimal overhead.

To achieve this, multiple approaches can be considered. For example, the UEs can provide the assistance report (e.g., assistance information) over the physical sidelink feedback channel (PSFCH) which is highly underutilized in NR release 16 (Rel-16). Alternatively, the assistance report can also be sent using the $2^{nd}$ stage sidelink control information (SCI), however a new SCI format might be needed to carry the assistance information. In addition, the assisted UE must be able to assess the reliability of the received assistance information and accordingly incorporate it with its sensing information when performing the resource selection.

SUMMARY

The present disclosure has been made to address the above-mentioned problems and disadvantages, and to provide at least the advantages described below.

In accordance with an aspect of the present disclosure, a UE is provided including a memory and a processor. The processor is configured to determine whether to send assistance information. In response to determining to send the assistance information, the processor is also configured to transmit the assistance information either via SCI or via a medium access control (MAC) control element (CE) having one or more resource selection assistance information elements.

In accordance with another aspect of the present disclosure a UE is provided including a memory and a processor. The processor is configured to transmit a request for assistance information to a second UE. The processor is also configured to receive assistance information either via SCI or via a MAC CE having one or more resource selection assistance elements.

In accordance with another aspect of the present disclosure, a UE is provided including a memory and a processor. The processor is configured to determine a need for assistance and send a request for assistance information via a MAC CE to an assisting UE.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
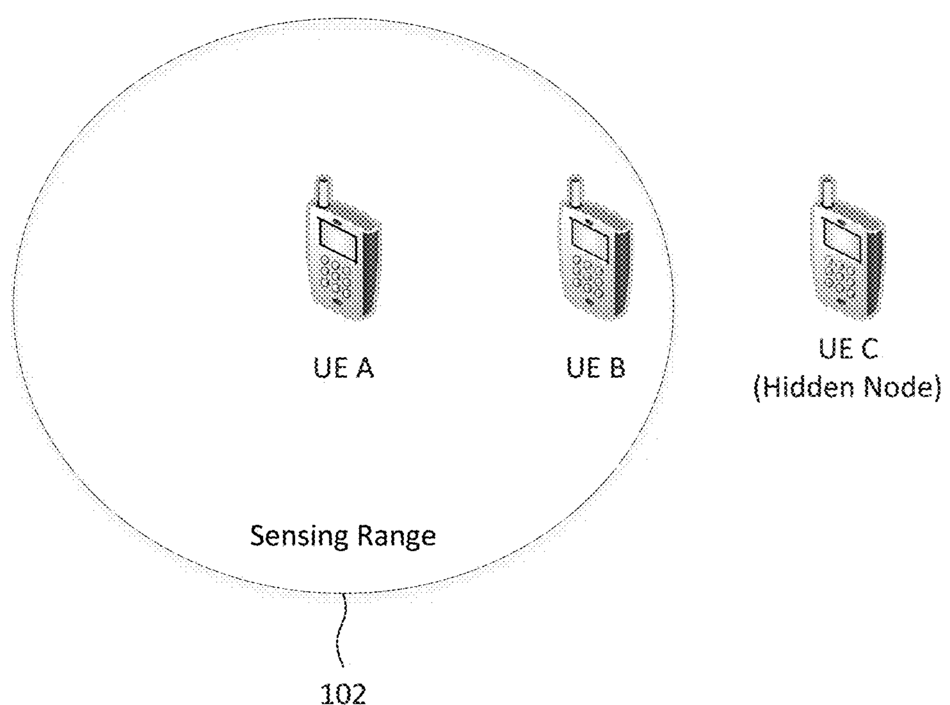
FIG. 1 illustrates a diagram of the hidden node problem, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to an embodiment, the present disclosure provides techniques to allow the efficient exchange of resource selection assistance reports between neighboring UEs (e.g., the exchange of assistance information between neighboring UEs). In particular, the proposed techniques reduce signaling overhead and enables UEs to provide the assistance feedback in a timely manner by using the PSFCH channel. It also allows UEs to send extended assistance reports using the SCI, whereby a new $2^{nd}$ stage SCI format is used. This newly proposed format also enables the dynamic variation of the size of the $2^{nd}$ SCI based on the size of the assistance information. This is done by splitting the $2^{nd}$ stage SCI into two segments (one has a fixed size while the other has a dynamic size). Additionally, the present disclosure also introduces conditions to assess the reliability of the received information, and the assisted UE can decide whether to incorporate this information with its sensing information when performing resource selection.

In NR V2X, UEs can operate in Mode 2 and accordingly select the resources for transmission independently from the base station (gNB). In this mode, the UEs define a sensing window and a resource selection window. In the sensing window all UEs that are not transmitting are required to monitor all subchannels to detect SCIs transmitted by their neighbors. Once an SCI is detected, its reference signal received power (RSRP) is measured and a set of resources can be considered as occupied in future slots within the resource selection window. This is because an SCI can indicate up to two future resources (e.g., subchannels and slots) as well as a periodicity in case of periodic transmissions. Subsequently, the sensing UE can identify a set of resources that are occupied in its resource selection window in order to avoid them. Despite the advantages of this procedure in reducing collisions (e.g., interference), its ability to avoid collisions is limited by a UE's sensing range. In particular, a UE will not be able to detect potentially interfering UEs outside its sensing range thus leading to collisions. This can happen, for instance, due to the hidden node problem.

FIG. 1 illustrates a diagram of the hidden node problem, according to an embodiment.

Referring to FIG. 1, if UE A attempts to communicate with UE B, it might interfere with the transmission of UE C despite being outside of its sensing range 102. This issue is also magnified in the case of periodic transmissions if nodes A and C select the same initial resource and period, thus leading to consistent transport block (TB) losses. In addition to the hidden node problem, the communication between the two nodes (UE A and UE B) in FIG. 1 can be also lost due to the half-duplex limitation. In particular, if UE A selects a resource that is also selected by UE B for transmission, then the TB sent from UE A to UE B will also be lost since UE B will not be able to receive it. This scenario can also cause significant degradation of performance in the case of periodic transmissions because UEs A and B can consistently lose the transmitted TBs if they both select the same transmission period and initial resource.

To address the drawbacks of Mode 2, several approaches are disclosed herein to improve the system's reliability and latency to support in-coverage, partial coverage, and out-of-coverage scenarios, and to address consecutive packet loss in all coverage scenarios. In particular, some approaches disclosed herein may include using UE assistance. For example, resource selection assistance may be performed by UE A by reporting a set of preferred/non-preferred resources to UE B, which may then take this information into account for its own transmission. Efficient gains may be realized if assistance reporting is performed in a timely manner with minimal overhead.

Resource selection assistance can play a key role in improving the performance of Mode 2 resource selection. This is because, it can directly address communication problems, such as the half-duplex issue, consistent collisions and the hidden node problem. Despite its advantages, the overhead associated with the assistance reports can limit their gains. In particular, to provide assistance, a UE is required to occupy some resources (when the assistance information is carried in the PSSCH or the PSCCH) which might result in a collision or can limit the resources available for regular transmissions and subsequently impede the system performance.

Accordingly, various proposals for UE assistance with reduced overhead will now be described.

Figure 2:
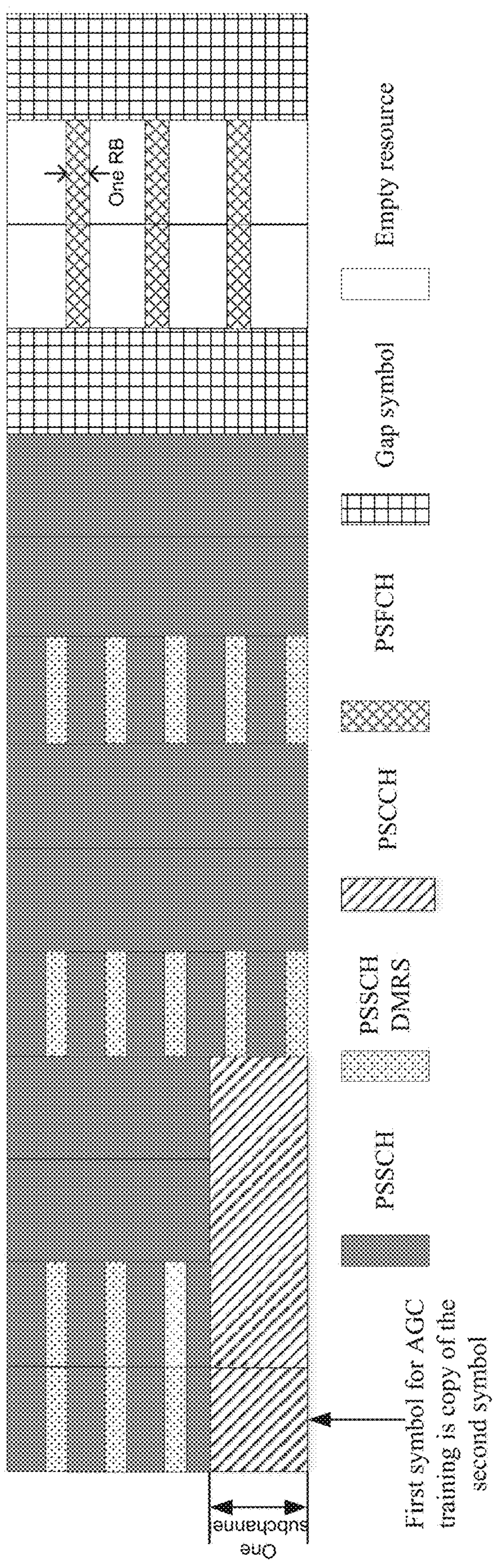
FIG. 2 illustrates a diagram of the frame structure of a sidelink slot with a PSFCH, according to an embodiment.

FIG. 2 illustrates a diagram of the frame structure of a sidelink slot with a PSFCH, according to an embodiment.

Referring to FIG. 2, the frame structure includes three channels including the PSSCH, the PSCCH, and the PSFCH.

The PSCCH may carry SCI information (e.g., the 1st stage SCI). The PSSCH may carry the data payload in addition to SCI information (e.g., the 2nd stage SCI). The PSFCH may carry the feedback information (e.g., HARQ ACK/NACK) used for assistance reporting.

Since the PSSCH provides a larger number of bits than the PSFCH, assistance information carried in the PSSCH may be larger in size, and indicate which specific resources to activate/deactivate.

The PSFCH may be used to transmit the feedback information from the Rx to the transmission (Tx) UEs using PSFCH resource offsets (e.g., sequence offsets) to carry different assistance information. For example, the assistance information (e.g., an assistance report) may be transmitted by applying a sequence offset in a frequency domain or a code domain on resources of the PSFCH. In addition, the assistance report may be transmitted on time resources of the PSFCH.

In NR V2X, although the PSFCH may only carry a finite number of bits, the number of PSFCH bits available may be much larger than needed. Therefore, assistance information carried in the PSFCH may provide an indication that is based on (e.g., correlated with) the number of bits (e.g., a predetermined bit sequence may indicate that a particular problem did or did not occur). A preconfigured action may be performed (e.g., resources may be activated/deactivated) in response to the indication provided by assistance information carried in the PSFCH.

According to an embodiment, a UE may utilize the PSFCH to provide resource selection assistance information to the Tx UE. This can be done by adding a specific offset to the member ID when selecting the PSFCH sequence.

The relationship between the applied PSFCH resource offset and the assistance information can depend on cast type (e.g., broadcast or unicast), and can be pre-configured per resource pool, or separately configured by the gNB for each UE.

For example, the PSFCH may carry the ACK/NACK feedback from the Rx UE to the Tx UE. In particular, PSFCH format 0 may be used to carry the ACK/NACK feedback in case of unicast, groupcast option 1 and groupcast option 2 transmissions. In the case of unicast, a sequence of length 12 may be sent over a specific physical resource block (PRB) to indicate an ACK and another sequence may be used to indicate a NACK (e.g., mutually exclusive). On the other hand, in the case of groupcast option 1, only one sequence may be used to carry a NACK and can be sent by any neighboring UE that failed to decode the PSSCH and falls within the desired target range indicated in the SCI carrying the groupcast transmission. In case of groupcast option 2, each UE within the group may be assigned two sequences (e.g., 1 for ACK and 1 for NACK). The selected sequence and the TB over which it is transmitted are dependent on the member ID (Note that in case of unicast, the member ID may be set to zero).

In case of unicast and groupcast option 1, a large number of sequences may not be utilized. This is also the case for groupcast option 2, when the subchannel size is large or when the number of members within the group is not large. For example, consider a scenario in which the subchannel size is equal to 10 PRBs and the PSFCH periodicity is equal to 1. In this scenario, there exists 60 possible PSFCH sequences (e.g., it is assumed that only 6 sequences per PRB can be used as each ACK/NACK requires a pair of sequences) which can be used to carry up to 5 bits of data. In addition, if all the sequences are being counted (e.g., both the ACK and NACK sequences), up to 6 bits of data can be carried. In the conventional scheme, only 2 sequences can be used in the case of unicast (e.g., 1 for ACK and 1 for NACK), only one sequence (e.g., for NACK) will be used in the case of groupcast option 1, and 2 sequences per member ID will be used in the case of groupcast option 2.

To achieve better utilization of the PSFCH resources, the sequences may be utilized to carry additional information (e.g., assistance information along with the ACK/NACK for resource selection) to the Tx UE. This can be done by using an additional PSFCH sequence offset, X, whereby each value of X indicates different assistance info (e.g., applying the numbers in the previous paragraph, up to 60 sequence offsets may exist, thereby allowing up to 5 bits of data to be carried).

In other words, the PSFCH sequence offset (X) (e.g., an offset amount between ACK/NACK in a PSFCH sequence) may be used as assistance information by providing an indication as to which resources to activate/deactivate based on the offset (X).

In particular, in NR V2X, a UE may determine an index of a PSFCH resource for a PSFCH transmission in response to a PSSCH reception as $$(P_{ID}+M_{ID})\bmod R_{PRB,CS}^{PSFCH}$$

where $$R_{PRB,CS}^{PSFCH}$$

is the number of available PSFCH resources, $P_{ID}$ is a physical layer source ID and $M_{ID}$ is the identity of the UE receiving the PSSCH as indicated by higher layers if the UE detects an SCI format 2-A with cast type indicator field value of "01"; otherwise, $M_{ID}$ is zero.

Subsequently, the value of X can be added as follows $$(P_{ID}+M_{ID}+X)\bmod R_{PRB,CS}^{PSFCH},$$

whereby each value of X can be used to indicate different assistance information (e.g., different resources to activate/deactivate).

As described above, readily available and underutilized PSFCH resources can be used to carry assistance information (e.g., in the case of unicast, only one ACK/NACK sequence is sent over one RB irrespective of the subchannel size). This assistance information can be carried by introducing an offset to each PSFCH sequence, whereby each offset indicates different assistance information.

The assistance information corresponding to each offset value may be configured by the Tx UE using radio resource control (RRC) signaling when unicast transmissions are intended. In this case, the number of configured offsets can depend on the UE capability according to the number of PSFCH sequences it can detect in a slot.

Additionally or alternatively, the assistance information corresponding to each offset value may be configured by the gNB for each UE and can be valid for a given duration or a given geographical location. In this case, the number of configured offsets can depend on the UE capability in terms of the number of PSFCH sequences it can detect in a slot.

Additionally or alternatively, the assistance information corresponding to each offset value may be configured per resource pool for all UEs. In this case, different assistance information can be configured for each cast type (e.g., an offset X might indicate a hidden node in the case of unicast, but can indicate a rejected resource selection in the case of groupcast option 2). In addition, two or more tables might be configured per cast type depending on the UE capability. For example, limited (e.g., low-power or weak signal) UEs can attempt to decode the PSFCH in the first few RBs and, due to their limited capabilities, get limited assistance information. On the other hand, more powerful UEs might be able to detect more PSFCH sequences, and thus get better assistance information.

Additionally or alternatively, the assistance information corresponding to each offset value may be fixed and specified ahead of time (preconfigured). Different assistance information can be defined for the same offset depending on the cast type. In addition, two or more tables might be defined per cast type depending on the UE capability.

To illustrate how the PSFCH offsets can be used and what kind of information they can carry, referring to FIG. 1, consider a scenario in which UE A is transmitting a TB in unicast mode to UE B and requests resource selection assistance from UE B for future transmissions. Now, UE B can provide an assortment of information using the PSFCH channel.

For example, UE B can use the PSFCH to confirm/reject resources selected by UE A for future transmissions in case they were indicated in the SCI or in the payload. This can be easily done by adding an additional offset X to the original member ID which is equal to zero in the case of unicast. For example, an offset equal to 10 can be used to confirm the resources selected by UE A, whereas an offset equal to 20 can be used to reject the selected resources (e.g., when there exists a hidden node or a half-duplex issue). In addition, even with the presence of the offset, the transmitted sequences still carry the ACK/NACK information.

Additionally or alternatively, UE B can also use the PSFCH to indicate some assistance information, such as the presence of a half-duplex or a hidden node problem. For example, adding an additional offset X equal to 10 may be used to indicate half-duplex issues, whereas an offset X equal to 20 can indicate the presence of a conflicting hidden node.

Additionally or alternatively, UE B can use the PSFCH to suggest a specific resource to be used for future transmissions by UE A. In particular, if PSFCH occurs at slot n and an offset equal to 10 is used by UE B, this can indicate to UE A that it is suggested to use slot n+10 for the next transmission to avoid potential collisions due to the hidden node or to avoid packet loss due to the half duplex issue.

Additionally or alternatively, UE B can also use the PSFCH to trigger reselection/pre-emption of the resources indicated by UE A. In particular, one or more specific offsets can be dedicated for reselection triggering and pre-emption triggering.

According to an embodiment, the PSFCH can also be used by neighboring UEs to provide assistance, even if they were not the targeted UE by the unicast transmission.

Figures 3A, 3B:
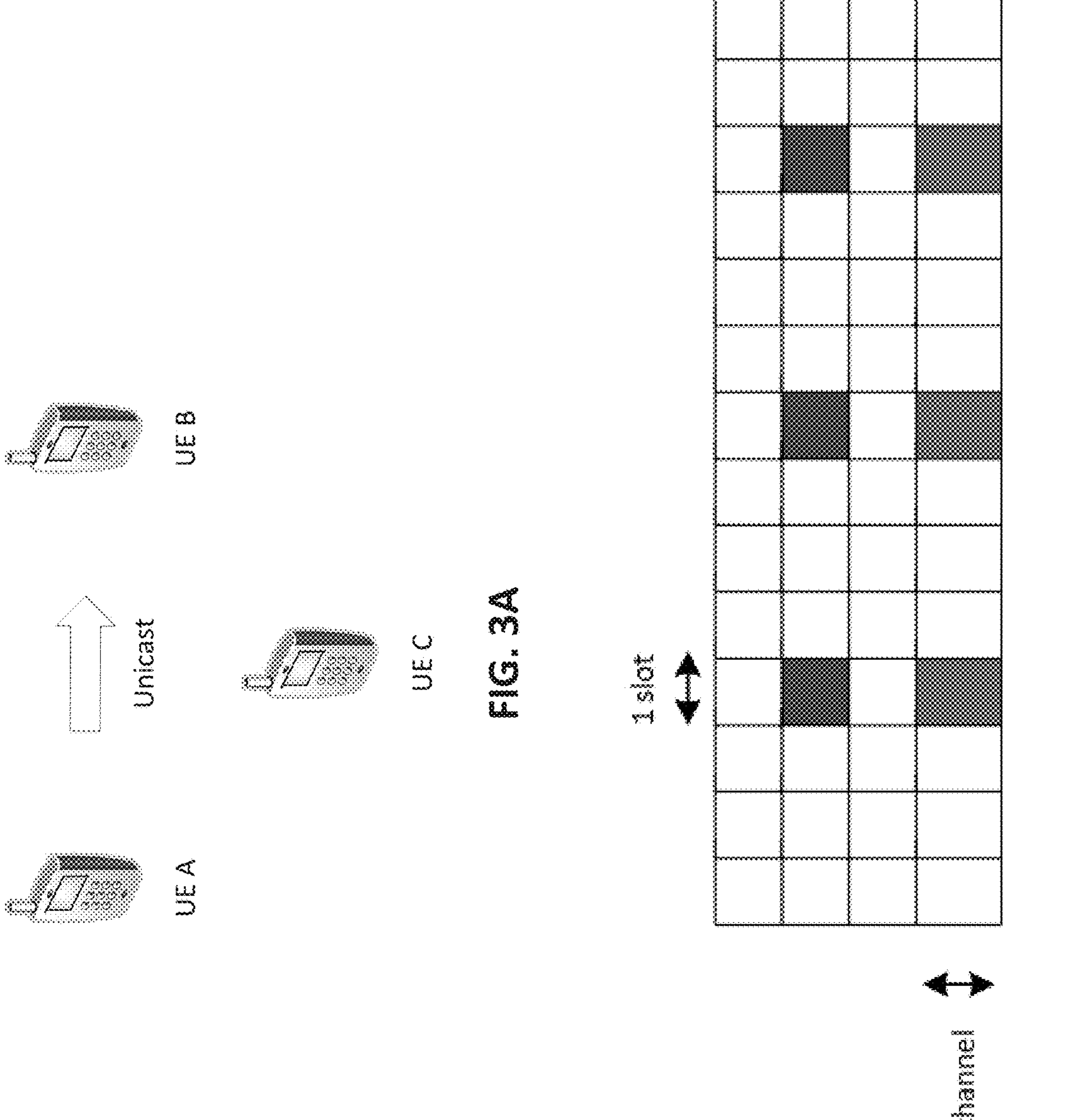
FIG. 3A illustrates a diagram in which UE A is attempting to perform unicast transmission with UE B, according to an embodiment.
FIG. 3B illustrates a unicast transmission, according to an embodiment.

In particular, consider the scenario depicted in FIGS. 3A and 3B.

FIG. 3A illustrates a diagram in which UE A is attempting to perform unicast transmission with UE B, according to an embodiment.

FIG. 3B illustrates a unicast transmission, according to an embodiment.

Referring to FIG. 3B, the shaded boxes on the $2^{nd}$ subchannel row and the $4^{th}$ subchannel row are the resources selected by UE A and UE B. In this case, since both UEs are performing transmission in the same set of slots, their transmissions will not be able to reach each other due to the half-duplex issue.

However, if another UE in the area (e.g., UE C) capable of detecting this scenario exists, it can provide assistance information. For example, UE C can provide a NACK with a specific offset to indicate the presence of the half-duplex issue although the ACK/NACK was expected from UE A or UE B. In addition, UE C can also use a preserved offset to trigger resource reselection by UE A or UE B.

Accordingly, a UE may provide assistance information based on an explicit assistance request from the Tx UE, which can be indicated in the SCI, the PSSCH or a previous PSFCH. Alternatively, the UE may provide assistance information proactively by using either the Rx UE or a neighboring UE once an issue is detected. Providing an assistance request in this case might not be obligatory, and the Rx UE might elect to discard the assistance request depending on its status (e.g., if it has limited power or if it does not have enough resources to provide the feedback).

Figure 4:
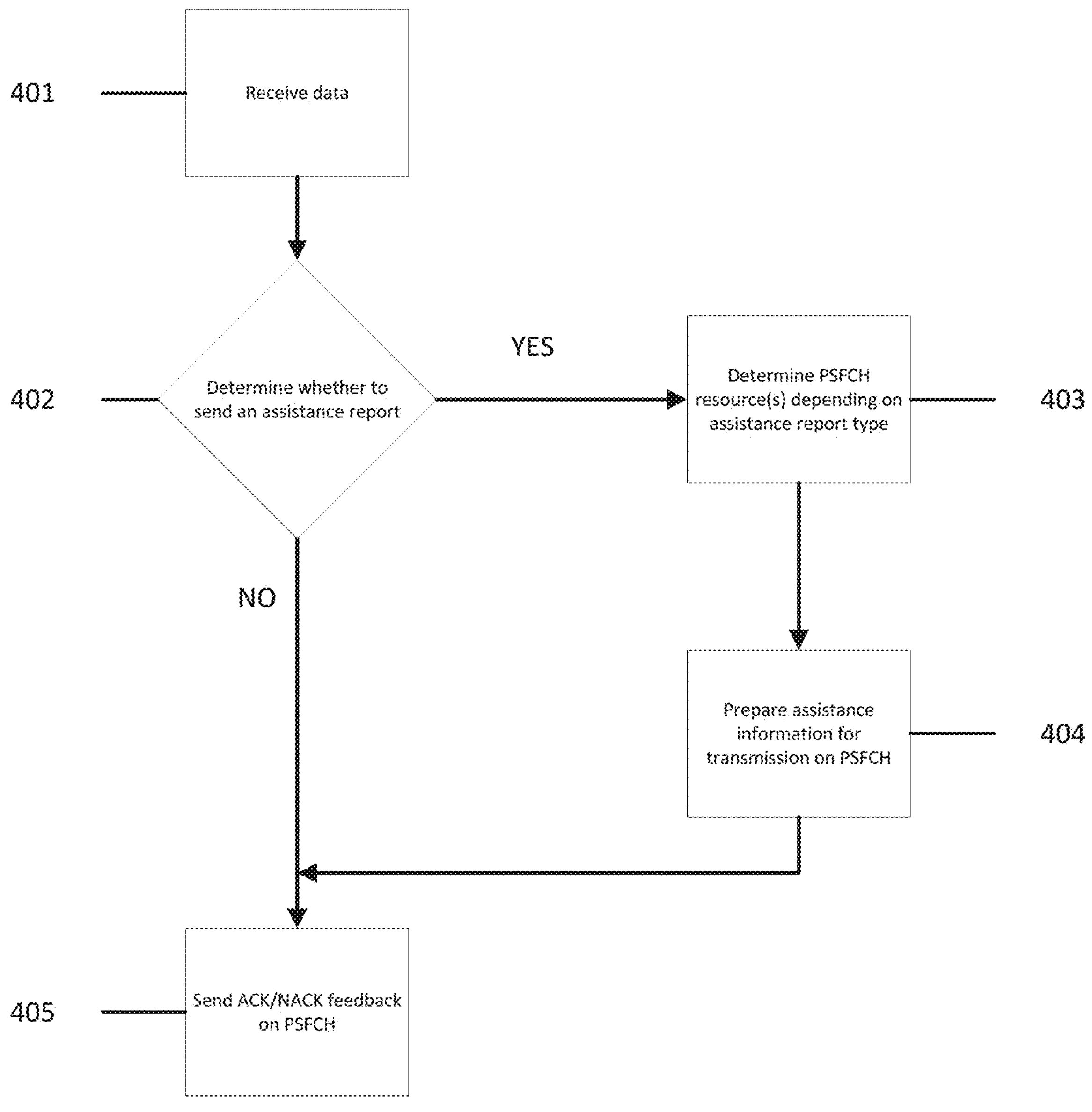
FIG. 4 illustrates a flowchart of providing assistance information via the PSFCH, according to an embodiment.

FIG. 4 illustrates a flowchart of providing assistance information via the PSFCH, according to an embodiment.

Referring to FIG. 4, in step 401, a UE receives one or more data packets. In step 402, the UE determines whether to send an assistance report. The determination may be based on, for example, a quality of the received data or a signal strength.

In step 403, if the UE determines to send the assistance report, then the PSFCH resources are determined depending on the assistance report type. For example, an association between an applied PSFCH resource offset and the assistance report may be based on assistance information that depends on a cast type, a pre-configured resource pool (e.g., a configuration shared across a plurality of UEs), or a configuration of a particular UE.

In step 404, the UE prepares the assistance information for transmission on the PSFCH. The assistance information may be included in the assistance report and may be prepared according to a PSFCH sequence offset amount.

In step 405, the UE transmits ACK/NACK feedback on the PSFCH. The UE may transmit the ACK/NACK feedback on the PSFCH to one or more other UE(s) or to one or more base stations (e.g., gNB(s)).

Accordingly, the transmission in step 405 may or may not include the assistance report (depending on if steps 403-404 have occurred). However, in either case, the overhead of the transmission is low since the PSFCH is underutilized especially in case of unicast and groupcast Option 1. In the case in which the assistance information is included in the PSFCH, an offset may be utilized to provide assistance information to indicate resources for activation/deactivation.

Thus, as described above, assistance information associated to (e.g., corresponding with) each PSFCH offset may be configured by RRC signaling by the Tx UE, pre-configured per resource pool, and/or configured by the gNB for each UE.

In addition, the assistance information associated to (e.g., corresponding with) each PSFCH offset can depend on the cast type (e.g., offset X can indicate a half-duplex in case of unicast and a hidden node in case of groupcast).

Additionally, the amount of assistance information carried over PSFCH can be dependent on UE capability (e.g., the more sequences that can be processed by the UE, the more assistance information the UE can acquire).

Examples of assistance information that can be carried by the PSFCH include confirmation or rejection of the resources selected by the Tx UE; resources suggested to be used by the Tx UE for a future transmission, whereby these resources are X slots away from the current one; a reselection/pre-emption trigger for UE A; and/or an indication of the presence of half-duplex issues for neighboring UEs.

In addition, a neighboring UE (not necessary the Rx UE) may utilize the PSFCH to provide resource selection assistance information to the Tx UE to facilitate the communication. This can be done by adding a specific offset to the member ID when selecting the PSFCH sequence.

For backward compatibility, the UE might be required to send two ACK/NACK sequences at the expense of PSFCH reliability. In particular, if the Tx UE capability is not known, in the case of unicast, one ACK/NACK sequence with member ID zero can be used to indicate an ACK/NACK to the Tx UE if it was a 3GPP 5G Rel-16 UE. At the same time, an additional ACK/NACK with offset X can be used to carry the information in case the Tx UE was a 3GPP 5G Release 17 (Rel-17) UE. However, this would require the UE to transmit two sequences simultaneously, thus reducing the Tx power per sequence by half and subsequently reducing the reliability of the PSFCH transmission.

In cases where no ACK/NACK is expected (e.g., in a broadcast scenario), one neighboring UE can still use the PSFCH resources, if configured for the resource pool, to provide assistance information to the Tx UE. In this case, the UE providing the assistance can send an ACK/NACK with a given offset that corresponds to the assistance information, as discussed above. Alternatively, since the ACK/NACK is not expected (e.g., in the case of the broadcast scenario), its offset can also be used to carry one additional bit of assistance information to further improve the performance (e.g., presence of first sequence indicates a half-duplex issue, whereas the second sequence indicates a pre-emption request). In this case, the assistance associated with this extra bit can be provided by one of the methods discussed above. The UE providing the assistance can be either dedicated (e.g., a road side unit (RSU)), pre-selected by the Tx UE in previous transmissions, or can be a neighboring UE proactively providing assistance to the Tx UE.

Two scenarios may exist for assistance when no ACK/NACK is expected, but instead assistance is provided on the PSFCH. In the first scenario, the Tx UE requests the assistance (e.g., by sending an implicit/explicit flag in the SCI), and in this case it will attempt to decode the PSFCH to obtain the assistance information. In the second scenario, the Tx UE doesn't request the assistance, but still blindly monitors the PSFCH in order to acquire the assistance information if a neighboring UE proactively sends assistance. In the second scenario, power might be wasted, as the Tx UE might attempt to decode the PSFCH despite the fact that no neighboring UE provided assistance. To address this drawback, one solution can be to limit the assistance to some specific problematic cases (e.g., providing assistance when a hidden node problem exists) to reduce the number of ACK/NACK sequences that need to be decoded (e.g., attempt only to decode with one specific offset to reduce the processing requirements). Another solution would be to make providing assistance dependent on a measured channel busy ratio (CBR). For example, the Tx UE will only attempt to decode the PSFCH if the measured CBR is above a certain threshold.

Therefore, when no ACK/NACK is expected (e.g., in a broadcast scenario), the PSFCH resources (if configured in the resource pool) can still be used to provide assistance. In this case one additional bit of assistance information may be provided.

In addition, when no ACK/NACK is expected (e.g., in a broadcast scenario), it may be determined that the Tx UE is required to send an assistance request to neighboring UEs to avoid wasting power.

Additionally, when no ACK/NACK is expected (e.g., in a broadcast scenario), and if assistance can be provided proactively by an Rx UE, it may be determined that the Tx UE is required to blindly decode the PSFCH, thus wasting power. To reduce power loss, either the assistance information can be limited to reduce the search space (e.g., the number of decoded ACK/NACKs), or it can be restricted to cases in which CBR is determined to be above a certain threshold.

According to an embodiment, the PSSCH may be used for resource assistance reporting. That is, a novel $2^{nd}$ stage SCI format may be used to carry the assistance information. To accomplish this, the $2^{nd}$ stage SCI may be split into two sections to allow variable sizes of assistance information to be conveyed, and different Beta offsets may be applied to each segment to offer a tradeoff between reliability and overhead. For example, the first section of the $2^{nd}$ stage SCI may have a fixed size and the second section may have a variable size, which may be indicated in the first segment.

One possible container to carry the assistance information is the $2^{nd}$ stage SCI. This is because the 1st stage SCI may be carried in the PSCCH, and the $2^{nd}$ stage SCI may be carried in the PSSCH and share resources with the payload.

Thus, the $2^{nd}$ stage SCI can occupy more resources when compared to 1st stage SCI and PSFCH, thereby allowing the $2^{nd}$ stage SCI to carry more assistance information bits. Resource selection assistance can be limited to a specific $2^{nd}$ stage SCI format (e.g., format 2-A) to reduce the overhead. However, a key factor in adopting an SCI format is how the assistance information will be carried over the $2^{nd}$ stage SCI resources.

Accordingly, a $2^{nd}$ stage SCI assistance message can include one or more of the following fields: a confirmation or rejection of resources selected by the Tx UE; an indication of specific scenarios with issues (e.g., a hidden node problem or a half-duplex issue); an indication of preferred or non-preferred resources; an indication of the perspective for preference; a time domain continuity field; a frequency domain continuity field; an availability of all subchannels within a slot flag; an all subchannels flag per resource indication; a close-by resources indication; a resource allocation shift field (M bits); a number of assistance resources information in the following fields (K bits); preferred/non-preferred resource time-domain location field(s); and preferred/non-preferred resource frequency-domain location field(s).

Confirmation or rejection of resources selected by the Tx UE refers to when the Rx UE can have a field (e.g., a 1-bit field) to indicate the confirmation or rejection of the current resource selection (e.g., 0 to indicate confirmation of resources, and 1 to indicate a rejection).

Indication of specific scenarios with issues (e.g., a hidden node problem or a half-duplex issue) refers to when the Rx UE can use a field (e.g., a 2-bit field), whereby each field value indicates a case (e.g., “00” indicates a half-duplex issue while “01” indicates hidden node problem). This field may only be present if the resources reserved are rejected, or it can always be present to reduce the complexity. Additionally, in case this field is always present, one value can be used to indicate the confirmation of the Tx UE resource selection (e.g., when this field is set to “11”, there may be no issues with Tx UE resource selection).

Indication of preferred or non-preferred resources refers to a field (e.g., a 1-bit field) that can be used to indicate whether the suggested resource information which will be present in subsequent fields are preferred or not preferred (e.g., 0 to indicate no preferred resources, and 1 to indicate preferred/non-preferred).

Indication of the perspective for preference refers to a field (e.g., a 1-bit field) used for indication of whether the resources are preferred/non-preferred to the UE providing the assistance or other UEs (e.g., “0” to indicate the preference is from the perspective of the UE providing the assistance, and “1” to indicate the preference is from the perspective of another UE). In addition, this field can be combined with the indication of preferred/non-preferred resources into a single field (e.g., a 2 bit field) and jointly indicate the following four states:

Preferred from Rx UE perspective.

Non-Preferred from Rx UE perspective.

Preferred from other UE(s) perspective.

Non-Preferred from other UE(s) perspective.

Time domain continuity field refers to a field (e.g., a 1-bit field) that can be used to indicate that the following resources are continuous and thus the following signaled resources will be the start and end points for the resource selection assistance. For example, if this field is set and slots 3 and 10 are being indicated by the assisting UE, then all slots in between 3 and 10 may also be available. In addition, the assistance information can include more than one starting point and ending point.

Frequency domain continuity field refers to a field (e.g., a 1-bit field) that can be used to indicate the subsequent resources are continuous in a frequency domain and thus subsequently indicated subchannels will be the starting and ending subchannels.

Availability of all subchannels within a slot flag refers to a flag (e.g., a 1-bit flag) that can indicate that all upcoming slots will have all their subchannels available. Hence, only time-domain information will be included. In this case, the resource indication can be interpreted differently in the sense that the time and frequency allocation of indicated resources can both refer to the time domain. This allows the UE to either signal more resources or to signal resources that are further in time.

All subchannels flag per resource indication refers to an X-bits field that can be added to indicate in resource assistance time-domain fields, for each of the X time slots, whether all the subchannels are available or only a subset of them are available. Subsequently, for the X time slots that have all subchannels available, the frequency-domain location fields can either be omitted to save bits or used jointly with the time-domain location fields to allow the UE to either signal more resources or to signal resources that are further in time.

Close-by resources indication refers to a bit (e.g., 1-bit) that can be added to indicate that the following resources will be provided as a bitmap whereby each element of the bitmap indicates a suggested slot for resource reservation. These slots can also be shifted by Y slots starting from the current one by adding additional z bits=$\log_2 Y$. This can be beneficial if a UE wants to reduce the signaling overhead and wants to suggest resources that are close in time.

Resource allocation shift field (M bits) refers to a field that can use the same resource allocation strategy in $1^{st}$ stage SCI (e.g., resource indication value (RIV)) which can be shifted (e.g., delayed) in the time-domain. One objective of this is to allow the UE to indicate resources that are further away in time rather than the current 32-slot restriction in $1^{st}$ stage SCI. This shift can also be in steps. For example, having a shift value of 5 and a pre-configured step of 20 can indicate a shift of 100 slots.

Number of assistance resources information in the following fields (the $2^{nd}$ stage SCI fields) (K bits) can be used to indicate the presence of up to 2^K resource selection assistance information. Alternatively, 1-bit can be added at the end of each resource selection to indicate that additional resource selection fields will follow.

Preferred/non-preferred resource time-domain location field(s) is a field in which the assisting UE may provide the information about the slot index in which the preferred/non-preferred resource occurs. Additionally, there can be as many (e.g., multiple) time-domain fields as necessary.

Preferred/non-preferred resource frequency-domain location field(s) is a field in which the assisting UE may provide the information about the starting subchannel index in which the preferred/non-preferred resource occurs, as well as the number of subchannels. Additionally or alternatively, the assisting UE can provide the starting and ending subchannels in this field.

According to an embodiment, the UE may select two resources in the same slot (e.g., subchannels 1 and 2 in slot X and subchannels 7 and 8 in slot X). In addition, a 1-bit field may be added to the 1st stage SCI to indicate the presence of assistance information in the $2^{nd}$ stage SCI, which may aid in decoding when Rel-16 and Rel-17 are multiplexed in the same resource pool. Alternatively, the indication of the presence of assistance information can be also done implicitly by setting one or more fields in the 1st stage SCI to specific values.

Accordingly, the number of bits required to carry the assistance information may vary. For instance, in cases wherein a time-continuity flag is set to 1, the UE may need to indicate the starting and ending resources only, and thus only a limited number of bits will be needed. However, the Rx UE may not be able to decode the 2nd stage SCI without knowing the size of the resource assistance information.

To address this issue, one possible approach is to split the 2nd stage SCI into two parts and decode them separately. The first part may have a fixed size, and after decoding the part with the fixed size, the Rx UE may determine the size of the variable part and decode it. A confirmation or rejection of resources field, an indication of specific scenarios with issues field, an indication of preferred or non-preferred resources field, an indication of the perspective for preference field, a time domain continuity field, a frequency domain continuity field, an availability of all subchannels within a slot flag, and a number of assistance resources information in the following fields (K bits) may be included in the part with the fixed size (e.g., the first segment of the 2nd stage SCI).

If the 2nd stage SCI is split into two parts with one having the fixed size and the other having a variable size, the rate matching applied on these two parts may also be done separately and sequentially. In particular, for each of the two parts, a different Beta offset value can be set, and the output of the rate matching of the second part may be dependent on the first part. In addition, the rate matching of the second part may only start after the rate matching of the first part is finished. In particular, for the fixed size part (the first segment of the 2nd stage SCI), Equation (1) can be used to calculate the number of coded modulation symbols after rate matching:

Equation (1)

$$Q'_{SCI2.p1} = \min\left\{\left\lceil \frac{(O_{SCI2.p1} + L_{SCI2.p1}) \cdot \beta_{offset}^{SCI2.p1}}{Q_m^{SCI2} \cdot R} \right\rceil, \left\lceil \alpha \sum_{l=0}^{N_{symbol}^{PSSCH}-1} M_{sc}^{SCI2}(l) \right\rceil\right\}$$

where $O_{SCI2.p1}$ is the number of bits of the fixed size part of the 2nd stage SCI; $L_{SCI2.p1}$ is the number of cyclic redundancy check (CRC) bits for the fixed size part of the 2nd stage SCI;

$$\beta_{offset}^{SCI2\cdot p1}$$

is the beta offset of the fixed size part of the 2nd stage SCI;

$$M_{sc}^{PSSCH}(l)$$

is the scheduled bandwidth of PSSCH transmission, expressed as a number of subcarriers;

$$M_{sc}^{PSSCH}(l)$$

is the number of subcarriers in orthogonal frequency division multiplexing (OFDM) symbol l that carry the PSCCH and PSCCH demodulation reference signal (DMRS) associated with the PSSCH transmission;

$$M_{sc}^{SCI2}(l)$$

is the number of resource elements that can be used for transmission of the 2nd-stage SCI in OFDM symbol l, for l=0, 1, 2 . . . , $$N_{symbol}^{PSSCH} - 1$$

and for $$N_{symbol}^{PSSCH} = N_{symb}^{sh} - N_{symb}^{PSFCH},$$

in PSSCH transmission, where $$N_{symb}^{sh} = sl\text{-}lengthSymbols - 2,$$

where sl-lengthSymbols is the number of sidelink symbols within the slot provided by higher layers (If higher layer parameter sl-PSFCH-Period=2 or 4, $$N_{symb}^{PSFCH} = 3$$

if "PSFCH overhead indication" field of SCI format 1-A indicates "1", and $$N_{symb}^{PSFCH} = 0.$$

If higher layer parameter sl-PSFCH-Period=0, $$N_{symb}^{PSFCH} = 0.$$

If higher layer parameter sl-PSFCH-Period is 1, $$N_{symb}^{PSFCH} = 3);$$

$$M_{sc}^{SCI2}(l) = M_{sc}^{PSSCH}(l) - M_{sc}^{PSCCH}(l);$$

R is the coding rate as indicated by the "modulation and coding scheme" field in SCI format 1-A; and α is configured by the higher layer parameter.

Once the number of coded modulation symbols of the fixed size part of the $2^{nd}$ stage SCI (the first segment of the $2^{nd}$ stage SCI) are calculated, the UE will be able to calculate the number of coded modulation symbols of the variable size part of the $2^{nd}$ stage SCI (the second segment of the $2^{nd}$ stage SCI). This can be done as according to Equation (2), as follows:

$$Q'_{SCI2.p2} = \min\left\{\left\lceil \frac{(O_{SCI2.p2} + L_{SCI2.p2}) \cdot \beta_{offset}^{SCI2.p2}}{Q_m^{SCI2} \cdot R} \right\rceil, \left\lceil \alpha \sum_{l=0}^{N_{symbol}^{PSSCH}-1} M_{sc}^{SCI2}(l) \right\rceil - Q'_{SCI2.p1}\right\} + \gamma \quad \text{Equation (2)}$$

where $O_{SCI2.p2}$ is the number of bits of the variable size part of the $2^{nd}$ stage SCI (this size will be known from the fields of the fixed size part of the $2^{nd}$ stage SCI); $L_{SCI2.p2}$ is the number of CRC bits for the variable size part of the $2^{nd}$ stage SCI;

$$\beta_{offset}^{SCI2\cdot p2}$$

is the beta offset of the variable size part of the $2^{nd}$ stage SCI;

$$M_{sc}^{PSSCH}(l)$$

is the scheduled bandwidth of PSSCH transmission, expressed as a number of subcarriers;

$$M_{sc}^{PSCCH}(l)$$

is the number of subcarriers in OFDM symbol l that carry the PSCCH and PSCCH DMRS associated with the PSSCH transmission;

$$M_{sc}^{SCI2}(l)$$

is the number of resource elements that can be used for transmission of the $2^{nd}$ stage SCI in OFDM symbol l, for l=0, 1, 2 . . . , $$N_{symbol}^{PSSCH} - 1$$

and for $$N_{symbol}^{PSSCH} = N_{symb}^{sh} - N_{symb}^{PSFCH},$$

in PSSCH transmission, where $$N_{symb}^{sh} = sl\text{-}lengthSymbols - 2,$$

where sl-lengthSymbols is the number of sidelink symbols within the slot provided by higher layers (If higher layer parameter sl-PSFCH-Period=2 or 4, $$N_{symb}^{PSFCH} = 3$$

if "PSFCH overhead indication" field of SCI format 1-A indicates "1", and $$N_{symb}^{PSFCH} = 0$$

otherwise. If higher layer parameter sl-PSFCH-Period=0, $$N_{symb}^{PSFCH} = 0.$$

If higher layer parameter $$sl\text{-}PSFCH\text{-Period is } 1,\ N_{symb}^{PSFCH} = 3.);\ M_{sc}^{SCI2}(l) = M_{sc}^{PSSCH}(l) - M_{sc}^{PSCCH}(l);$$

R is the coding rate as indicated by the "modulation and coding scheme" field in SCI format 1-A; $\gamma$ is the number of vacant resource elements in the resource block to which the last coded symbol of the complete $2^{nd}$ stage SCI belongs; $Q'_{SCI2.p1}$ is the number of coded modulation symbols of the fixed size part of the $2^{nd}$ stage SCI; and $\alpha$ is configured by higher layer.

For the second part of the $2^{nd}$ stage SCI, the upper bound on the size may depend on the size of the first part. In addition, the value of $\gamma$ may be added to ensure that size of the complete $2^{nd}$ stage SCI is aligned with the resource block size.

In addition, it may be necessary to consider other factors to determine the $2^{nd}$ stage SCI. For example, the reliability of the $2^{nd}$ stage SCI and the impact on the PSSCH resources may be considered. In particular, the $2^{nd}$ stage SCI bits may be multiplexed with those of the PSSCH. In addition, the number of coded symbols used by the $2^{nd}$ stage SCI may be affected by the code rate of the PSSCH, the Beta offset parameter and the number of bits for the $2^{nd}$ stage SCI.

Given the larger size of the $2^{nd}$ stage SCI relative to the $1^{st}$ stage SCI, the number of allocated coded symbols might need to be adjusted. This can be addressed by either changing the range of the $$\beta_{offset}^{SCI2}$$

for Rel-17 UEs that provide or require assistance. In particular, three $$\beta_{offset}^{SCI2}$$

ranges can be pre-configured per resource pool (one for Rel-16 UEs and two for Rel-17 UEs, where the first is for the fixed size part of the $2^{nd}$ stage SCI and the other is for the variable size part of the $2^{nd}$ stage SCI).

Alternatively, a new parameter (e.g., X) can be pre-configured per resource pool to provide better adjustment of the number of coded symbols for Rel-17 UEs. This parameter can be multiplied by the $$\beta_{offset}^{SCI2}$$

and can have a value of 1 for legacy Rel-16 UEs. An objective of this parameter may be to allow the UE to dedicate more resources to the $2^{nd}$ stage SCI or to limit the number of resources that can be dedicated to the $2^{nd}$ stage SCI depending on a requirement. For example, setting X>1 may allow more resources for $2^{nd}$ stage SCI, thus increasing its reliability. Setting X<1 may reduce the $2^{nd}$ stage SCI resources and subsequently reduce its reliability, but may allow for more resources for PSSCH. The value of X can also be set differently for each of the two parts of the second $2^{nd}$ stage SCI (e.g., the fixed size and the variable size parts).

In addition, the upper bound on the $2^{nd}$ stage SCI resources $$\left(\text{“}\left\lceil \alpha \sum_{l=0}^{N_{symbol}^{PSSCH}-1} M_{sc}^{SCI2}(l) \right\rceil\text{”}\right)$$

may also need to be adjusted. This can be done by pre-configuring multiple values of α per resource pool. The UE may use the corresponding value of α when assistance is included. In particular, one value of α can be configured for Rel-16 UEs and another value for Rel-17 UEs. Alternatively, another parameter can be configured (e.g., Y) and multiplied by the value of α for Rel-17 UEs. Further, the same parameter X that was used to multiply the value of $$\beta_{offset}^{SCI2}$$

can also be used to adjust the value of α. Thus, if the $1^{st}$ stage SCI included a field (e.g., a 1 bit field) to indicate the presence of assistance information or if the presence of assistance information is implicitly indicated in the $1^{st}$ stage SCI (e.g., by setting one or more fields to predefined values), then no confusion will occur for the Rx UE when decoding the $2^{nd}$ stage SCI. In this case, the Rx UE will know which range of $$\beta_{offset}^{SCI2}$$

and which values of a to use or the values of the additional parameters X and Y, if pre-configured.

Figure 5:
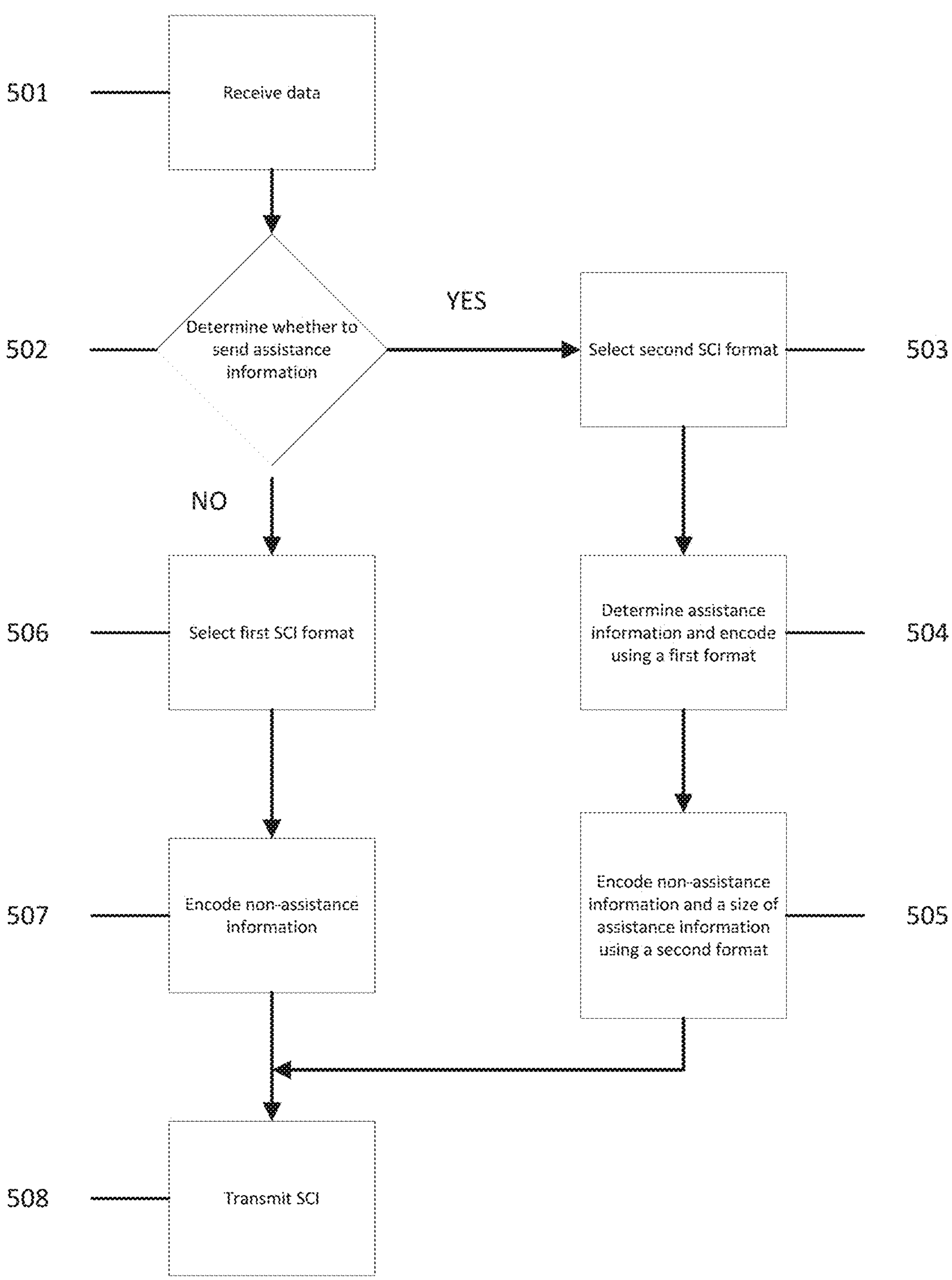
FIG. 5 illustrates a flowchart of using a 2nd stage of the SCI to carry assistance reports, according to an embodiment.

FIG. 5 illustrates a flowchart of using a second stage of the SCI to carry assistance reports, according to an embodiment.

Referring to FIG. 5, in step 501 a UE receives one or more data packets. In step 502, the UE determines whether to send assistance information. The determination may be based on, for example, a field or parameter included in an assistance request, a quality of the received data or a signal strength.

In step 503, if the UE determines to send the assistance information, then a second SCI format is selected (e.g., $2^{nd}$ stage SCI format with a first fixed size segment and a second variable size segment).

In step 504, the assistance information is determined and encoded using a first format. An indication of the presence of the assistance information in the $2^{nd}$ stage SCI may be provided in the $1^{st}$ stage SCI by adding a 1-bit field or setting one or more fields to specific values. The assistance information may be provided in a second segment of the $2^{nd}$ stage SCI having a variable size. Once the size of the assistance information encoded into the $2^{nd}$ stage SCI is known (e.g., after step 504 has occurred), then the process may proceed to step 505.

In step 505, non-assistance information and a size of the assistance information is encoded using a second format. The size of the assistance information may be encoded in the first segment of the $2^{nd}$ stage SCI.

In step 508, the UE transmits the SCI. The SCI may be transmitted to one or more other UE(s) or to one or more base stations (e.g., gNB(s)).

Alternatively, in step 502, if the UE determines not to send the assistance information, then in step 506, a first SCI format is selected. In step 507, the non-assistance information is encoded.

In the case in which the UE determines not to send the assistance information (NO in step 502), then the $2^{nd}$ stage SCI may not be split into a first segment having a fixed size and a second segment having a variable size. Rather, the $2^{nd}$ stage SCI may be a single segment having a variable size.

After step 507, the UE transmits the SCI in step 508. The SCI may be transmitted to one or more other UE(s) or to one or more base stations (e.g., gNB(s)).

Accordingly, the $2^{nd}$ stage SCI can be used to carry the resource selection assistance information by using one or more of the following fields: a confirmation or rejection of resources selected by the Tx UE; an indication of specific scenarios with issues (e.g., a hidden node problem or a half-duplex issue); an indication of preferred or non-preferred resources; an indication of the perspective for preference; a time domain continuity field; a frequency domain continuity field; an availability of all subchannels within a slot flag; an all subchannels flag per resource indication; a close-by resources indication; a resource allocation shift field (M bits); a number of assistance resources information in the $2^{nd}$ stage SCI field; preferred/non-preferred resource time-domain location field(s); and preferred/non-preferred resource frequency-domain location field(s).

In addition, to allow the Rx UE to decode the assistance information, the $2^{nd}$ stage SCI assistance information may be split into two parts. The first part, which has a fixed size, can indicate the size of the second part. For example, the first part of the $2^{nd}$ stage SCI can be decoded first, which indicates the size of the second part of the $2^{nd}$ stage SCI, which can then be decoded.

To improve the reliability of $2^{nd}$ stage SCI assistance information or reduce the assistance overhead, three beta offset ranges, two alpha values, and/or two additional parameters can be pre-configured per resource pool.

For example, three beta offsets can be pre-configured per resource pool (e.g., one for Rel-16 UEs and two for Rel-17 UEs, whereby one may be pre-configured for the fixed size part and another for the variable size part of the $2^{nd}$ stage SCI).

Additionally or alternatively, two alpha values can be pre-configured per resource pool (e.g., one for Rel-16 UEs and another for Rel-17 UEs).

In addition, two additional parameters (e.g., X and Y) can be pre-configured per resource pool. These parameters can be used by Rel-17 UEs to adjust the values of the beta offset range and the alpha value. Two values of X can be preconfigured per resource pool (e.g., one for the fixed size part of $2^{nd}$ stage SCI and another for the variable size part of the $2^{nd}$ stage SCI).

Accordingly, as explained above, the $2^{nd}$ stage SCI may be split into two parts in order to carry assistance information. The $1^{st}$ part of the $2^{nd}$ stage SCI may have a fixed size and the $2^{nd}$ part of the $2^{nd}$ stage SCI may have a variable size. When encoding, the $2^{nd}$ stage SCI, the $2^{nd}$ part having the variable size may be encoded first and include the assistance information. After the assistance information is encoded and the size of the $2^{nd}$ part of the $2^{nd}$ stage SCI is known, then the $1^{st}$ part of the $2^{nd}$ stage SCI may be encoded and the size of the $2^{nd}$ part of the $2^{nd}$ stage SCI may be encoded into the $1^{st}$ part of the $2^{nd}$ stage SCI.

When decoding, the $1^{st}$ part of the $2^{nd}$ stage SCI (having the fixed size) may be decoded before the $2^{nd}$ part of the $2^{nd}$ stage SCI. That is, the $1^{st}$ part of the $2^{nd}$ stage SCI may be decoded before the $2^{nd}$ part of the $2^{nd}$ stage SCI to reveal the size of the $2^{nd}$ part of the $2^{nd}$ stage SCI. Once the size of the $2^{nd}$ part of the $2^{nd}$ stage SCI is known, then the $2^{nd}$ part of the $2^{nd}$ stage SCI may be decoded and the assistance information may be obtained.

According to an embodiment, UE behavior may be modified by dynamically adding constraints to reduce signaling overhead associated with resource selection assistance.

For example, UE assistance with reduced signaling overhead may be achieved by limiting assistance based on a sensed environment (e.g., a resource occupancy level).

Additionally, assistance may be limited to specific problematic cases, such as the hidden node problem, the exposed node problem, the half-duplex problem and/or when the system is highly occupied.

Figure 6:
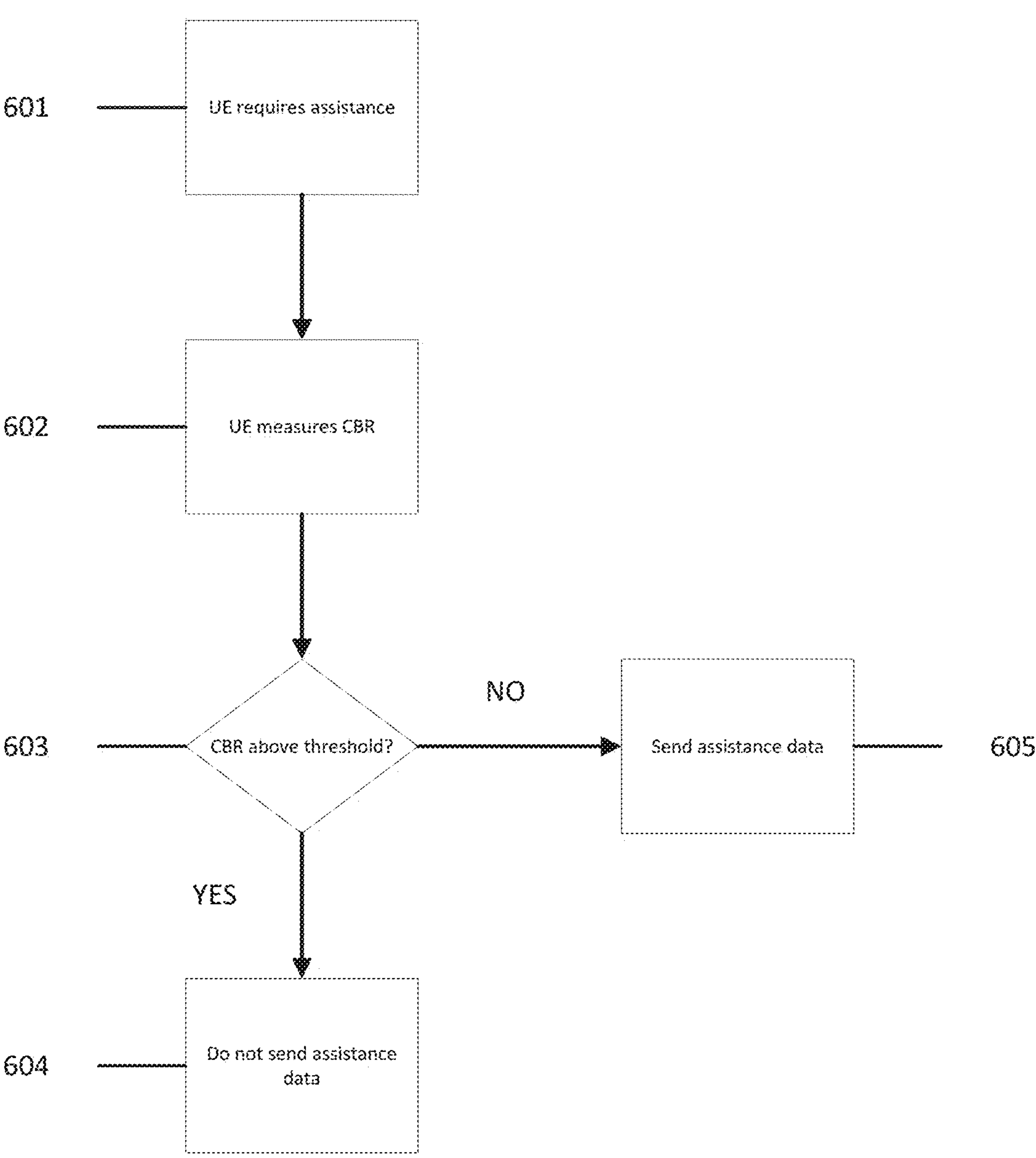
FIG. 6 illustrates a flowchart for determining whether to send assistance data, according to an embodiment.

FIG. 6 illustrates a flowchart for determining whether to send assistance data, according to an embodiment.

Referring to FIG. 6, in step 601 a UE is determined the require assistance. Then, in step 602, the UE measures a CBR value. In step 603, the UE determines whether the CBR value is above a threshold. If a UE detects a high CBR (above a certain threshold) in step 603, the UE does not send assistance data in step 604. Alternatively, if the UE detects a low CBR (not above the threshold), the UE sends assistance data in step 605.

Alternatively, if the UE detects a high CBR (YES in step 603), then the UE may send assistance data in certain situations. For example, the UE can limit its assistance to specific cases such as consistent collisions or collisions due to the half-duplex issue, but not due to the hidden node problem. Similarly, a UE may only be allowed to provide assistance to avoid consistent collisions (e.g., in the case of periodic transmissions) when the system is highly occupied.

Accordingly, assistance may be limited to specific scenarios (e.g., consistent collisions) when the system occupancy is above a threshold (e.g., a CBR level is above a certain threshold) to reduce the overhead.

In addition, the amount of assistance information to be shared by neighboring UEs may be limited based on the system occupancy (e.g., a CBR level). For example, when the system is highly occupied, only a subset of the assistance information may be provided to reduce the associated overhead. Although this might degrade the quality of the assistance information, it can help in avoiding some issues, such as the half-duplex issue.

The amount of assistance information may be reduced by reporting slot info only (e.g., no subchannel information). Additionally or alternatively, the amount of assistance information may be reduced by selecting preferred (or not preferred) sets based on system occupancy (e.g., preferred sets when the system is highly occupied and not preferred sets when the system is lightly loaded). In addition, resources may be reported in terms of continuous sets instead of discretely one by one (e.g., using starting and ending slots). For example, in order to maintain the continuity, some resources may be indicated as occupied although they are actually free.

In addition, UE assistance with reduced overhead may be achieved by reserving resources periodically for assistance information. This may help in avoiding collisions by pre-selecting a set of resources for providing assistance that can be kept for longer durations. This approach may even reduce the need for sensing.

Reserving resources periodically may be essential in cases in which a centralized coordinator exists. Some examples of centralized coordinators include an RSU and platoon heads. These resources can be reserved by using the Rel-16 resource selection procedure (e.g., sensing resource selection and indication of future reservations using SCI fields). These periodic reservations can be restricted to the cases when the system is lightly loaded, and these resources can be used for resource assistance reporting (either to suggest preferred resources or to resolve potential collisions). Using these resources, for example, the platoon head can provide resource selection assistance to the platoon members either proactively or when assistance is requested. Alternatively, these resources can also be used to obtain assistance information by the platoon members from the platoon head, or by the platoon head from the platoon members.

When the assistance comes from the platoon head (either proactively or based on a request from the platoon members), the platoon head can provide the assistance information in the SCI or in the PSSCH as a medium access control (MAC) control element (CE) and send it over the periodically reserved resources. Both participating and non-participating UEs in the platoon will be aware of the resource reservation and avoid certain resources to prevent collisions. Accordingly, in this case, no extra signaling is required as the resources are being used by the centralized coordinator which reserved them.

On the other hand, when assistance comes from the platoon members based on a request from the platoon head, the platoon head can indicate, to the assisting UE, the resources over which it expects the assistance information to be provided as a MAC CE. In this case, the assisting UE will use one or more of the periodically reserved resources by the centralized coordinator to provide the assistance information. For UEs not participating in the platoon, they will detect these resources as reserved and will not attempt to use them, thereby avoiding collisions.

Additionally, for UEs participating in the platoon, they may detect a collision since the resources suggested by the platoon head for resource assistance reporting are already reserved. This issue can be resolved if each UE saves the IDs of the UEs that reserved resources, then if the UE suggesting to use a resource for assistance reporting is the one which has reserved the resource, it can be considered a non-collision case. Alternatively, if each UE doesn't save the IDs of the UEs that did the resource reservations then a collision may be detected. To address this, a UE participating in a platoon may be considered a non-collision case only if the UE suggesting the resource is the centralized coordinator (e.g., the identification (ID) of the UE providing that suggested resource for assistance reporting should be taken into consideration).

Resources can be reserved periodically by the centralized coordinator irrespective of whether data to send is present. The selected period can depend on the number of members in case of groupcast (e.g., a platoon) or a value of the CBR.

Accordingly, reservation of periodic resources may be allowed for resource assistance reporting. These resources can also be exclusively used by RSUs or platoon heads to reduce the chances of collisions.

Thus, collisions can be avoided in assistance reports (e.g., assistance information) because resources are periodically reserved in advance.

Accordingly, limiting UE assistance to specific scenarios, periodically reserving resources for assistance, and carrying assistance information over the PSFCH, as described above, are each novel approaches for UE assistance overhead reduction. The relative advantages and disadvantages of these approaches are shown below in Table 1.

TABLE 1

| | Limiting UE assistance to specific scenarios | Periodic reservation of resources for assistance | Carrying of assistance information over PSFCH |
|---|---|---|---|
| Amount of reserved resources | Depends on CBR and number of requests for resource reservation | Depends on the CBR | Depends on the subchannel size and PSFCH periodicity |
| Overhead | Medium overhead as resources are reserved only when assistance is requested | High overhead as resources are periodically reserved and might not be used | No overhead |
| Power consumption | Medium since a complete transmission is needed (PSCCH and PSSCH) | Medium since a complete transmission is needed (PSCCH and PSSCH) | Low since only an ACK/NACK sequence is sent over one PRB (two sequences might be needed for backward compatibility) |
| Amount of assistance information | High | Medium | Low |
| Latency | Medium and depends on the CBR as UE will need to find free resources to transmit | High and depends on CBR since selected assistance periodicity might be large | Low and depends only on PSFCH periodicity |
| Likelihood of collisions | Susceptible to collisions especially when CBR is large | Collision free as resources are periodically reserved for assistance | Collision free and doesn't depend on CBR |

Additionally, UE behavior may be modified to assess the reliability of assistance information to avoid implementing outdated/unreliable assistance information.

A key factor in the success of resource selection assistance may be the techniques by which the assistance information is implemented after it is received. In particular, the method in which the UE adopts the received assistance information can significantly impact the system performance.

Figure 7:
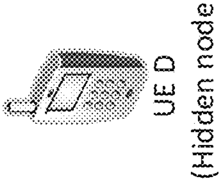
FIG. 7 illustrates a diagram showing adoption of assistance information based on a UE location, according to an embodiment.
Figure 7:
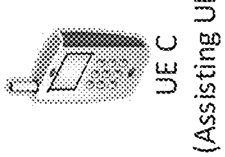
Figure 7:
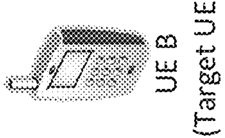
Figure 7:

FIG. 7 illustrates a diagram showing adoption of assistance information based on a UE location, according to an embodiment.

Referring to FIG. 7, UE C may indicate the presence of a hidden node problem to UE A, but since UE A's relative location is far from UE C, the assistance might be neglected. This, and other factors, should be considered when adopting the assistance information.

For example, it may be necessary to consider adopting assistance information only when the assisting UE is in a trusted UE list.

In addition, it may be necessary to consider treating the assistance information coming from a gNB/RSU differently from assistance information received from a regular assisting UE. For example, the assistance information coming from an RSU can be directly adopted, whereas assistance information received from an assisting UE may be considered to be a suggestion.

Additionally, it may be necessary to consider using the assistance information only if the assisting UE's RSRP is above a certain threshold. This is because the reliability of the assistance information may depend on the proximity of the assisting UE.

Accordingly, the Rx UE may be allowed to assess the reliability of the received resource assistance report before taking it into consideration. This assessment can be based on one or more of the received RSRP level, the relative location of the UE providing the assistance, the type of the UE providing the assistance (e.g., a regular UE or an RSU), or the assisting UE being in a trusted UE list.

Figure 8:
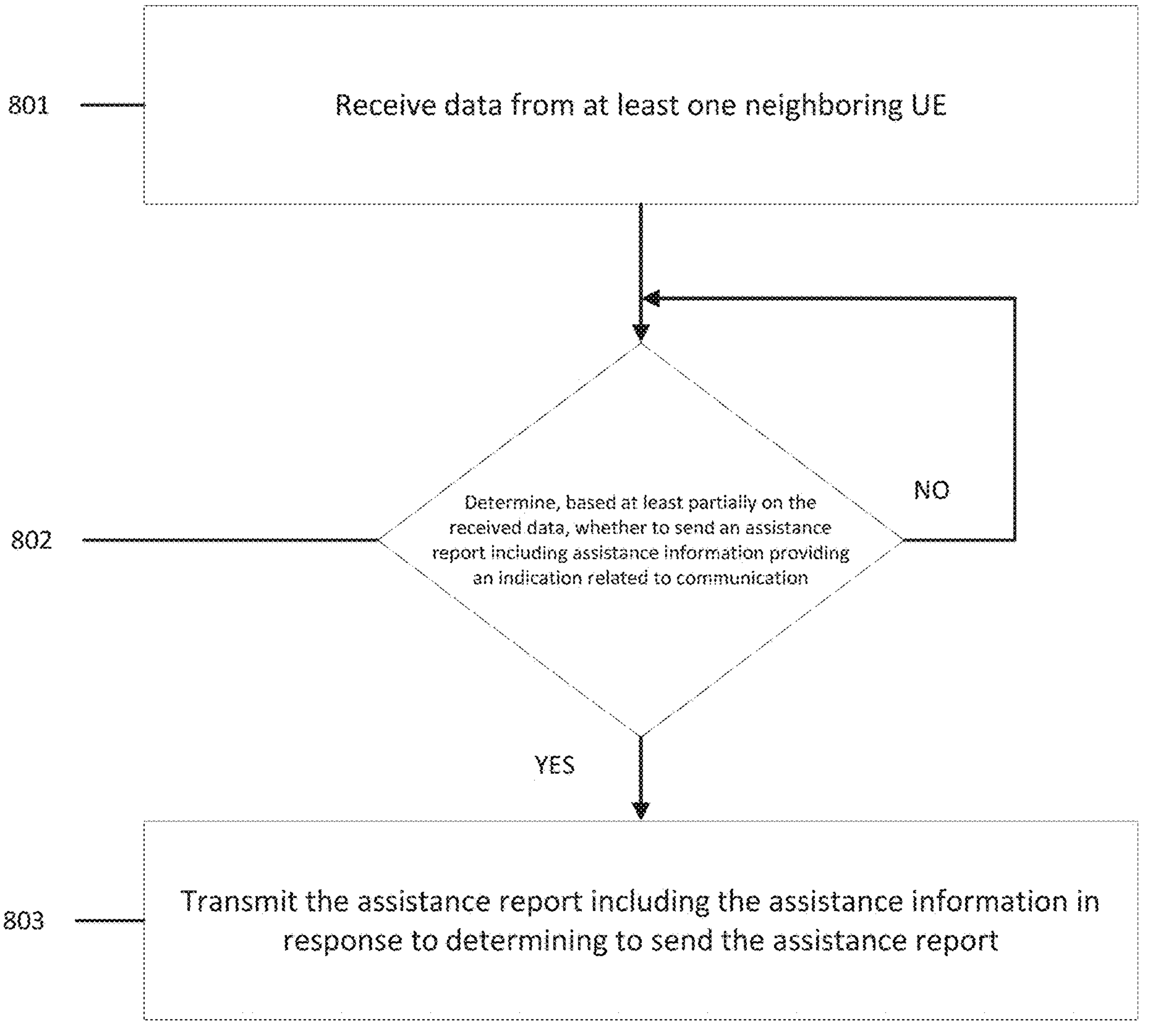
FIG. 8 illustrates a flowchart for a method of providing assistance information, according to an embodiment.

FIG. 8 illustrates a flowchart for a method of providing assistance information, according to an embodiment. Any of the components or any combination of the components described (e.g., in the device diagrams) can be used to perform one or more of the operations of the flowchart of FIG. 8. The operations depicted in the flowchart of FIG. 8 are example operations and may involve various additional steps not explicitly provided in the flowchart. The order of the operations depicted in the flowchart is exemplary and not exclusive, as the order may vary depending on the implementation.

At step 801, a UE receives data from at least one neighboring UE. The received data may be any type of data received from a neighboring UE, such as configuration information (e.g., information used to configure periodic assistance reporting transmissions), an assistance request, or an indication of resources for data transmission. At step 802, the UE determines, based at least partially on the received data, whether to send an assistance report including assistance information providing an indication related to communication. An indication related to communication may be any type of information that provides assistance to aid the UE in communicating data. For example, an indication related to communication may be an indication of a resource for data transmission or an indication of a type of communication problem (e.g., a half-duplex problem, a hidden node problem, or an exposed node problem).

At step 803, when the UE determines to send the assistance report, the UE transmits the assistance report including the assistance information.

Alternatively, if the UE does not determine to send the assistance report, then the procedure continues performing step 802.

Figure 9:
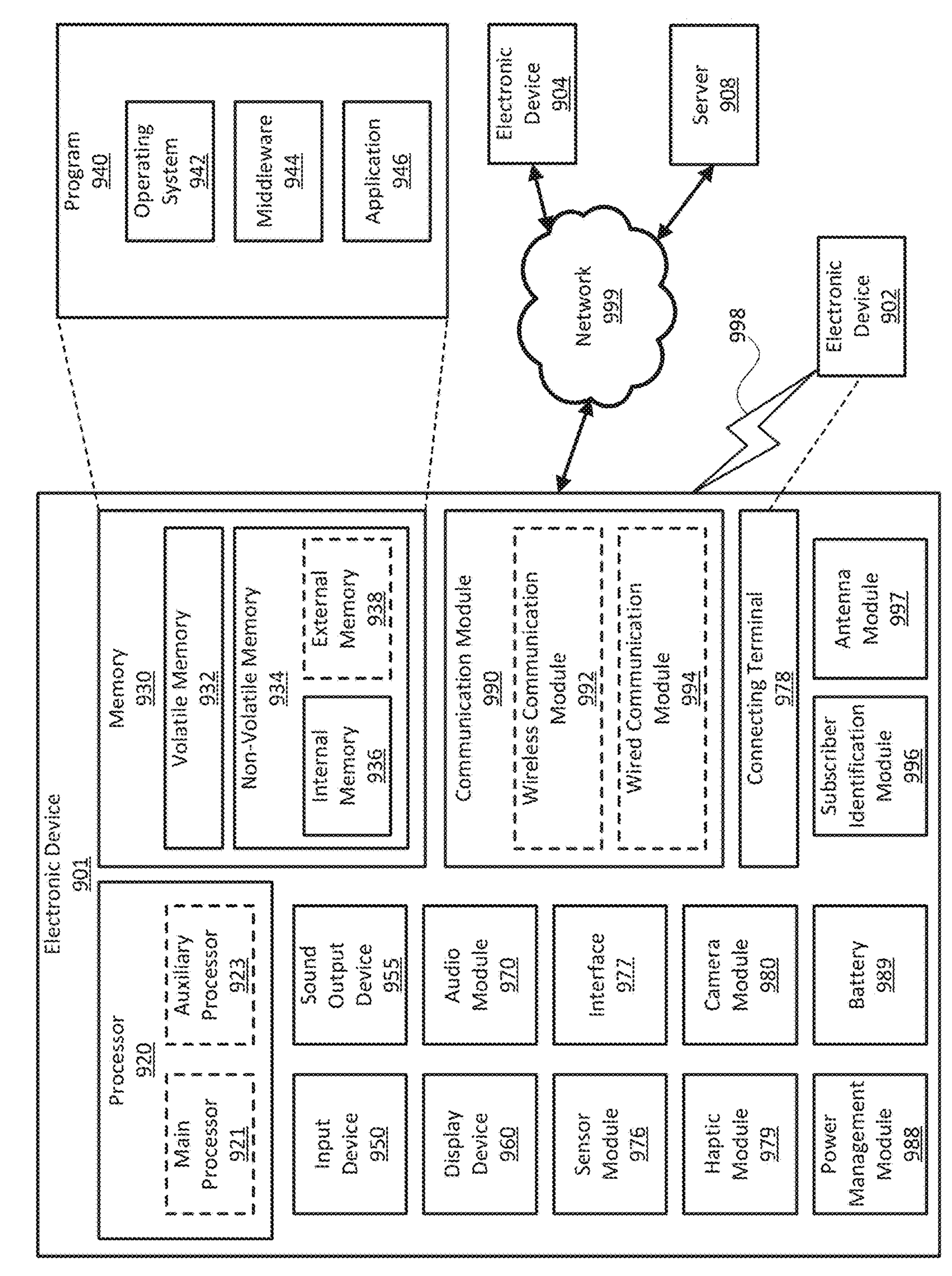
FIG. 9 illustrates an electronic device in a network environment, according to an embodiment.

FIG. 9 illustrates an electronic device in a network environment, according to an embodiment.

Referring to FIG. 9, the electronic device 901, e.g., a mobile terminal including GPS functionality, in the network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997 including a GNSS antenna. In one embodiment, at least one (e.g., the display device 960 or the camera module 980) of the components may be omitted from the electronic device 901, or one or more other components may be added to the electronic device 901. In one embodiment, some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute, for example, software (e.g., a program 940) to control at least one other component (e.g., a hardware or a software component) of the electronic device 901 coupled with the processor 920, and may perform various data processing or computations. As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor, and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to one embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to one embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to one embodiment, the audio module 970 may obtain the sound via the input device 950, or output the sound via the sound output device 955 or a headphone of an external electronic device 902 directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wiredly) or wirelessly. According to one embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. According to one embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. According to one embodiment, the haptic module 979 may include, for example, a motor, a piezoelectric element, or an electrical stimulator.

The camera module 980 may capture a still image or moving images. According to one embodiment, the camera module 980 may include one or more lenses, image sensors, image signal processors, or flashes.

The power management module 988 may manage power supplied to the electronic device 901. The power management module 988 may be implemented as at least part of, for example, a power management integrated circuit (PMIC).

The battery 989 may supply power to at least one component of the electronic device 901. According to one embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor) and supports a direct (e.g., wired) communication or a wireless communication. According to one embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to one embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

One embodiment may be implemented as software (e.g., the program 940) including one or more instructions that are stored in a storage medium (e.g., internal memory 936 or external memory 938) that is readable by a machine (e.g., the electronic device 901). For example, a processor of the electronic device 901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A user equipment (UE), comprising:

a memory; and a processor configured to:

determine whether to send assistance information; and in response to determining to send the assistance information, transmit the assistance information either via sidelink control information (SCI) or via a medium access control (MAC) control element (CE) having one or more resource selection assistance information elements, wherein the assistance information indicates a first time offset to a reference slot and a second time offset from the reference slot to a future resource in a time domain, wherein the reference slot is determined by applying a time-domain shift value to a current slot.

2. The UE of claim 1, wherein the assistance information indicates at least one resource for data transmission.

3. The UE of claim 1, wherein the assistance information identifies a type of the UE.

4. The UE of claim 1, wherein the assistance information has a variable size depending on a number of assistance information elements being transmitted.

5. The UE of claim 1, wherein the assistance information indicates either a set of preferred or non-preferred resources for data transmission.

6. The UE of claim 1, wherein the assistance information is transmitted on time resources of a physical sidelink shared channel (PSSCH).

7. The UE of claim 1, wherein the assistance information is sent on periodically reserved resources that are indicated to the assisted UEs.

8. The UE of claim 1, wherein each assistance information element is indicated using a time resource indicator and a frequency resource indicator.

9. A user equipment (UE), comprising:

a memory; and a processor configured to:

transmit a request for assistance information to a second UE; and receive assistance information either via sidelink control information (SCI) or via a medium access control (MAC) control element (CE) having one or more resource selection assistance information elements, wherein the assistance information indicates a first time offset to a reference slot and a second time offset from the reference slot to a future resource in a time domain, wherein the reference slot is determined by applying a time-domain shift value to a current slot.

10. The UE of claim 9, wherein the assistance information indicates at least one resource for data transmission.

11. The UE of claim 9, wherein the assistance information identifies a type of the assisting UE.

12. The UE of claim 9, wherein the assistance information has a variable size depending on a number of information elements being transmitted.

13. The UE of claim 9, wherein the assistance information indicates either a set of preferred or non-preferred resources for data transmission.

14. The UE of claim 9, wherein the assistance information is transmitted on time resources of a physical sidelink shared channel (PSSCH).

15. The UE of claim 9, wherein the assistance information is sent on periodically reserved resources that are indicated to the assisted UEs.

16. The UE of claim 9, wherein each assistance information element is indicated using a time resource indicator and a frequency resource indicator.

17. A user equipment (UE), comprising:

a memory; and a processor configured to:

determine a need for assistance;

send a request for assistance information via a medium access control (MAC) control element (CE) to an assisting UE;

receive the assistance information from the assisting UE, the assistance information indicating a first time offset to a reference slot and a second time offset from the reference slot to a future resource in a time domain;

assess reliability of the assistance information based on whether the assisting UE is in a trusted UE list; and determine the reference slot indicated by the assistance information by applying a time-domain shift value to a current slot.

18. The UE of claim 17, wherein the reliability of the assistance information is based on a location of the assisting UE.

* * * * *